(12) United States Patent
Schmidt et al.

(10) Patent No.: US 6,269,643 B1
(45) Date of Patent: Aug. 7, 2001

(54) TURBOCHARGER SYSTEM FOR INTERNAL COMBUSTION ENGINES

(75) Inventors: Erwin Schmidt, Baltmannsweiler; Siegfried Sumser, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/446,608

(22) PCT Filed: Jun. 16, 1998

(86) PCT No.: PCT/EP98/03613

§ 371 Date: May 11, 2000

§ 102(e) Date: May 11, 2000

(87) PCT Pub. No.: WO99/00589

PCT Pub. Date: Jan. 7, 1999

(30) Foreign Application Priority Data

Jun. 26, 1997 (DE) .............................. 197 27 141

(51) Int. Cl.⁷ .................................................. F02D 23/00
(52) U.S. Cl. .................. 60/602; 123/559.1; 415/204; 415/206; 415/164
(58) Field of Search .......................... 60/602; 123/559.1; 415/204, 206, 164, 146

(56) References Cited

U.S. PATENT DOCUMENTS

| | | | |
|---|---|---|---|
| 4,474,006 | 10/1984 | Price et al. | 60/602 |
| 4,617,799 | * 10/1986 | Todokoro et al. | 60/602 |
| 4,809,509 | 3/1989 | Hohkita . | |
| 5,146,752 | * 9/1992 | Bruestle | 60/602 |
| 5,839,281 | * 11/1998 | Sumser et al. | 60/602 |

FOREIGN PATENT DOCUMENTS

| | | | |
|---|---|---|---|
| 39 02 049 A1 | * 7/1990 | (DE) | 123/559.1 |
| 42 32 400 | 8/1993 | (DE) . | |
| 198 53 360 A1 | * 5/2000 | (DE) . | |

OTHER PUBLICATIONS

Patent Abstracts of Japan—Publication No. 01104925, Publication Date Apr. 21, 1989.

* cited by examiner

*Primary Examiner*—Thomas Denion
*Assistant Examiner*—Thai-Ba Trieu
(74) *Attorney, Agent, or Firm*—Crowell & Moring, L.L.P.

(57) ABSTRACT

A description is given of an internal combustion engine/turbocharger configuration for an internal combustion engine/turbocharger system, which configuration allows maximum braking power combined with low thermal loading.

15 Claims, 2 Drawing Sheets

TURBOCHARGER SYSTEM FOR INTERNAL COMBUSTION ENGINES

Figure 1:
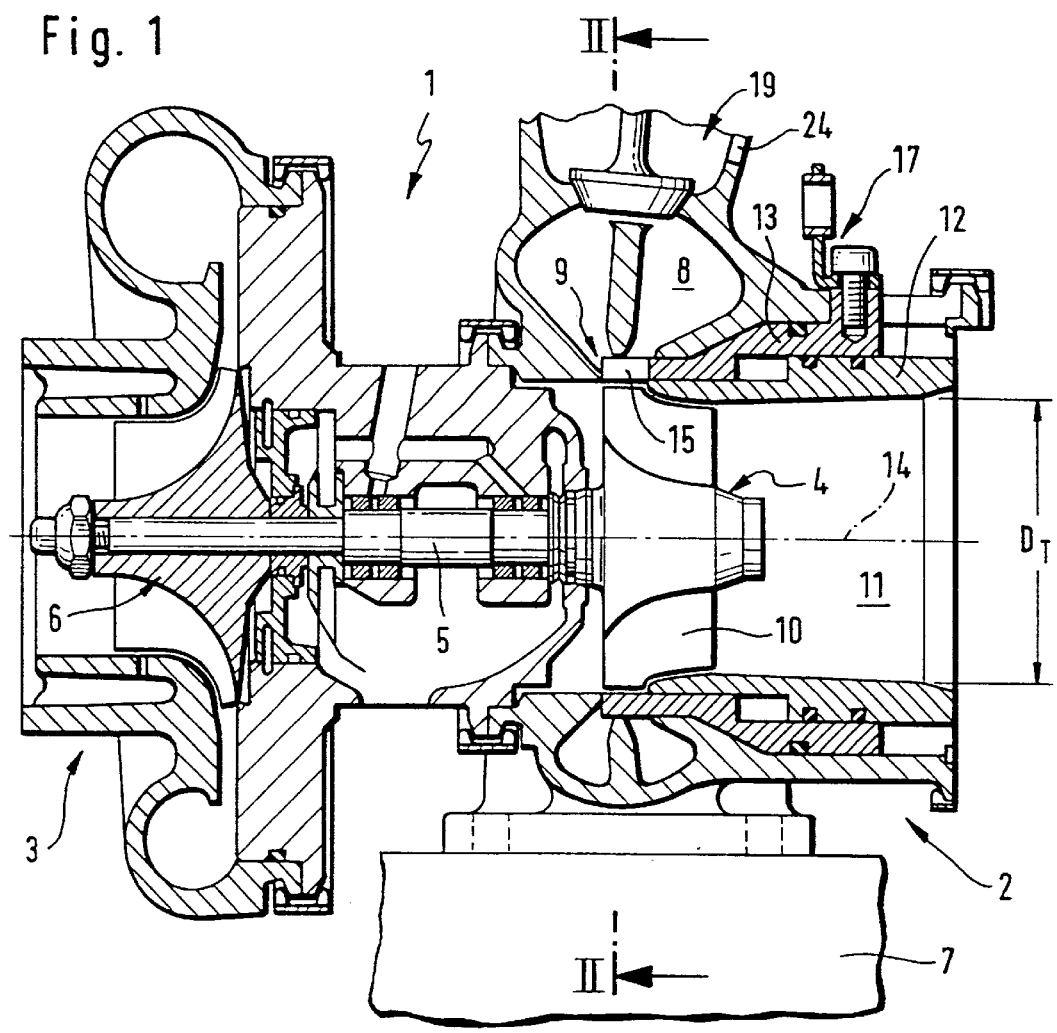

The invention relates to an internal combustion engine/turbocharger system in accordance with the precharacterizing clause of claim 1.

Internal combustion engine/turbocharger systems of the abovementioned type are known, for example, from DE 42 32 400 C1. In this case, an annular insert can be slid axially into the region in the form of an annular nozzle starting from the flow duct and opening onto the turbine rotor, this insert being designed in part as a guide vane system and having guide vanes at different angles of incidence, which are brought into effect as a function of the axial setting of the annular insert. The annular insert, which is formed by a displaceable tubular sleeve component, has an axial region which is moved into axial overlap, as a shut-off device, with the inlet region in the form of an annular nozzle, for the braking mode and the cross section of passage of which is dimensioned in such a way that, acting as a restrictor for the exhaust gas, it defines the narrowest cross section of flow—invariable in braking mode—at the transition to the turbine rotor. In this way, it is possible to achieve high braking powers, but there are difficulties in implementing these braking powers at low thermal loading of the internal combustion engine, especially in a suitable relationship with the engine speed and over a sufficiently wide engine-speed band, resulting overall in difficulties in finding an appropriate internal combustion engine/turbocharger configuration which meets these requirements.

The invention is intended to provide an internal combustion engine/turbocharger system which will make possible the high braking powers desired for the braking mode in a suitable relationship with the engine speeds significant for the driving mode, while combining this with relatively low thermal loads.

This is achieved in internal combustion engine/turbocharger systems by a design in accordance with the features of Claim 1, according to which the main parameters of the turbine are defined in such a way, in relation to the total displacement of the internal combustion engine, that maximum braking powers are made possible with comparatively low thermal loading of the internal combustion engine and in a sufficiently broad engine-speed range suitable for the operation of commercial vehicles.

In this context, the following relation applies:

$$TBF = A_T \times \frac{D_T}{V_H}$$

where $A_T$ denotes the cross section of flow exposed by the shut-off device acting as a fixed restrictor and the blow-off valve in the exhaust path to the turbine at maximum braking power, $D_T$ denotes the inlet diameter of the turbine rotor and $V_H$ denotes the displacement of the internal combustion engine. TBF forms a turbo-braking factor, which, in the context of the invention, is less than 0.005 (5%) and is preferably 0.001 to 0.003 (1–3%).

Based on maximum braking power as the design point, the cross section of flow exposed in the exhaust path to the turbine at maximum braking power in the context of the invention is formed by a cross-sectional component exposed at the transition to the turbine by the shut-off device, covering a lower engine-speed range, and a variable cross-sectional component, which is larger than that for the design point, namely maximum braking power, and is formed by the outflow cross section exposed by the blow-off valve. In the context of the invention, the ratio of the additional, variable cross-sectional component, which increases towards the maximum braking power and corresponds to the outflow cross section exposed by the blow-off valve, to the cross-sectional component exposed by the shut-off device, is greater than 0.2 for the design point, namely maximum braking power, and is preferably in the range between 0.2 and 1. With a small ratio, the braking power in the lower engine-speed range is relatively low and rises relatively steeply in the upper engine-speed range; with a large ratio, a higher braking power is obtained in the lower engine-speed range, with a less steep rise in the braking power towards the point of maximum braking power as the design point, in comparison with smaller ratios. Based on the speed band of the engine, the upper speed range, in which the additional, variable outflow cross section defined by the blow-off valve is exposed, begins at about ⅔ to ¾ of the speed at maximum braking power, the speed at maximum braking power lying within a range which is about ¼ to ⅓ times greater than the rated speed of the internal combustion engine, i.e. the speed at the maximum power of the internal combustion engine.

Figure 3:
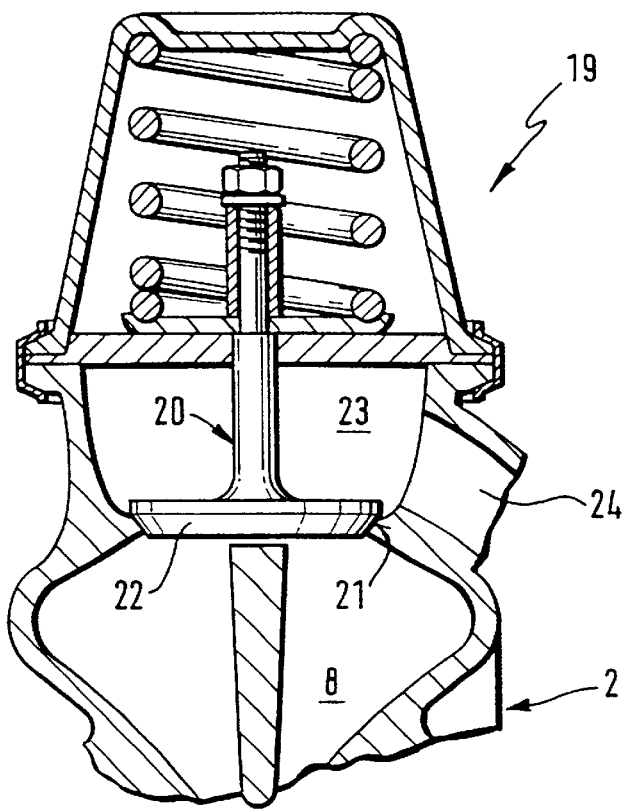
Figure 4:
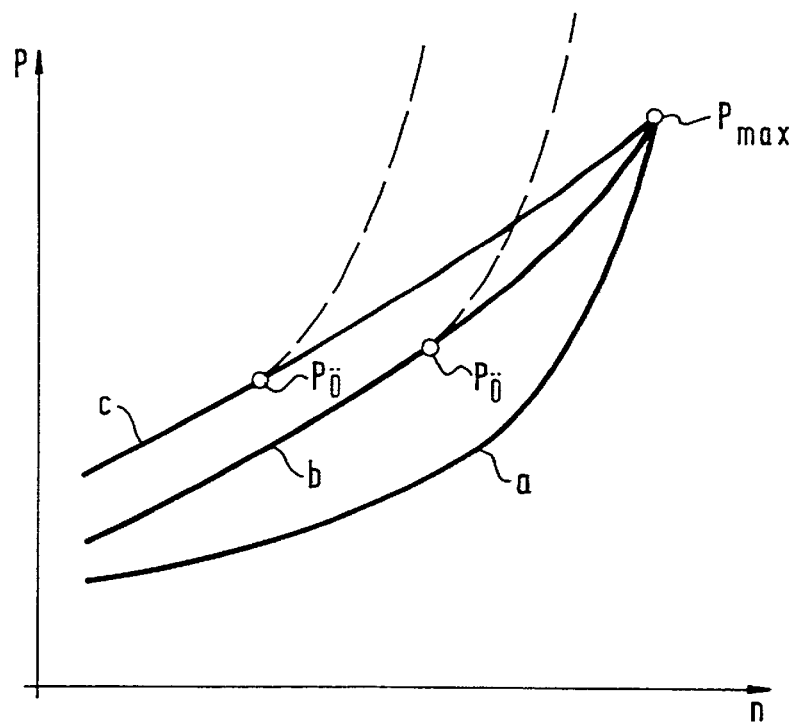

Further details and features of the invention will become apparent from the claims. The invention is furthermore explained in greater detail below with reference to drawings, in which FIG. 1. shows a section through a turbocharger in schematic representation, FIG. 2 is a section along the line II—II in FIG. 1, showing the shut-off device, which is designed as a guide vane system, FIG. 3 is an enlarged, highly schematized sectional representation of the arrangement and design of a blow-of valve, and FIG. 4 is a schematic diagram which illustrates the basic variation in braking power against engine speed for different ratios of the variable outflow cross section additionally exposed at maximum braking power to the cross section of flow with the shut-off device closed.

Figure 2:
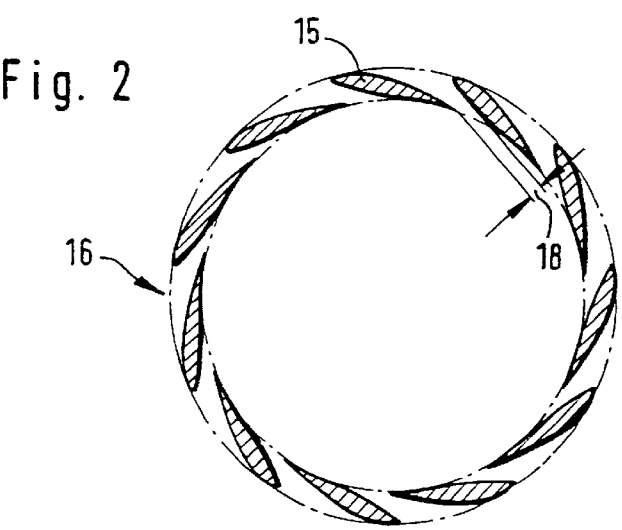

In the schematic diagrams in FIGS. 1 and 2, 1 denotes the turbocharger, which comprises a turbine component 2 and a compressor component 3, the turbine rotor 4 driving the compressor impeller 6 via a shaft 5. The turbocharger 1 is associated with the engine 7, shown in outline, and the exhaust gases from the engine 7 flow first of all from the engine into the flow duct 8 of the turbine component 2, which is a dual-flow spiral duct which surrounds the turbine rotor 4 and opens via a radial, annular duct that forms an annular nozzle 9 onto the blades 10 of the turbine rotor 4, by means of which the radially entering exhaust gases are deflected and fed to an axial duct 11, which is connected in a manner not shown to the exhaust system of the internal combustion engine or vehicle.

A tubular sleeve 13, which can be displaced in the direction of the common axis 14 and, at its end associated with the annular nozzle 9, carries a guide vane system 16 formed by guide vanes 15, is supported relative to the casing 12 delimiting the axial duct 11, coaxially with the annular nozzle 9, the turbine rotor 4 and the axial duct 11. By axial adjustment of the sleeve 13—the adjusting means 17 are not shown specifically—the guide vane system 16 can be displaced out of an inactive position (not shown here), in which the cross section of the annular nozzle 9 is free, into the position shown in FIG. 1, in which the guide vanes 15 of the guide vane system 16 are in the cross section of the annular nozzle, thereby acting as a shut-off device which significantly reduces its free cross section of flow. For the exhaust gases fed in via the flow duct 8, the guide vane system 16 thus forms a restriction which lies in the region of the annular nozzle 9 and has a fixed cross section determined by the guide vane system, thus allowing the inflow of exhaust gases from the flow duct 8 to the turbine rotor 4 to be restricted by sliding the guide vane system 16 into the region of the annular nozzle 9. This is intended for the braking mode in order to increase the braking power of the engine by means of the back pressure of the exhaust gases, the blading additionally ensuring an inlet flow to the turbine rotor 4 which ensures that the compressor provides an adequate delivery rate and, at the same time, also a basic speed of the turbocharger to ensure a rapid turbocharger response at the transition from braking mode to power mode.

FIG. 2 shows that the selected position and shape of the vanes 15 results in a significant reduction in the cross section of flow within the annular nozzle 9, the cross section left free for the exhaust gas by the vanes 15 at the transition to the turbine 4 corresponding essentially to the number of vanes times the radial spacing 18 between the vanes in the region of their overlapping ends.

As explained, sliding the guide vane system 16 associated with the sleeve 13, with its vanes 15, axially into the annular space of the annular nozzle 9 creates a restriction. Given appropriate design of the guide vane system, the restriction thereby achieved could be so great that the internal combustion engine 7 would be destroyed as the flow of exhaust gas increased with increasing engine speed. To prevent this and to provide the engine with braking behaviour which is suitable for practical operation and, despite high braking power, keeps down the thermal load on the internal combustion engine in braking mode, the flow duct 8 is, as shown by way of example in FIG. 3, assigned a blow-off valve 19, the valve 20 of which is loaded in the direction of its illustrated closed position and, in the closed position, covers a valve seat 21 with its valve plate 22, which cuts into both flows of the flow duct 8. If the valve 20 is opened, exhaust gas can-flow from both passages of the flow duct 8, via the valve seat 21, to a valve space 23, which is connected by a duct 24 (not shown in detail) to the exhaust system of the internal combustion engine 6o vehicle, so that, with valve 20 open, the blow-off valve 19 creates a bypass for the exhaust gases of the engine 7 relative to their inlet-flow path to the turbine. As a deviation from the illustrative embodiment shown, this bypass can also open onto the outflow-side region of the blades of the turbine rotor.

The present invention defines relationships between the internal combustion engine, the turbocharger and the achievable braking power based on the premise of minimum thermal loading for the internal combustion engine and the turbocharger.

The inlet diameter of the exhaust gases to the turbine rotor is significant to this extent, and this inlet diameter is denoted in the illustrative embodiment shown in FIGS. 1 and 2 by $D_T$.

Also significant is the cross section of flow exposed at maximum braking power by the shut-off device at the transition to the turbine rotor and the blow-off valve in the exhaust path to the turbine. This cross section is made up of a fixed component and a variable component. The fixed component is defined by the shut-off device, that is to say, for example, the geometry of the guide vane system, while the variable component is defined by the degree of opening of the blow-off valve. The shut-off device does not have to be formed by a guide vane system with guide vanes but could, for example, also be designed as a sleeve which has holes or cutouts of corresponding cross section.

In the illustrative embodiments shown, the inflow to the turbine rotor takes place at a uniform diameter since the annular nozzle surrounds the turbine rotor radially.

However, there are also conceivable and known solutions in which different inlet-flow paths are provided in accordance with the dual-flow nature of the flow duct, the "annular nozzle" thus comprising, for example, a radial and a semi-axial duct component. Different inlet diameters to the turbine rotor are then obtained for these duct components, and it may then be expedient, applying the teaching according to the invention, to weight the cross-sectional components, taking into account the respective inlet diameter, to form an averaged inlet diameter $D_T$.

The relationship which is given in accordance with the invention and which leads to an internal combustion engine/turbocharger system in which high braking powers are associated with relatively low thermal loads in the braking mode is as follows:

$$TBF = A_T \times \frac{D_T}{V_H}$$

where TBF forms a turbo-braking factor which is less than 0.005 and preferably between 0.001 and 0.003, and in particular is 0.002. $V_H$ denotes the overall volume of the internal combustion engine.

Mention has already been made of the fact that the cross section of flow exposed by the shut-off device and the blow-off valve in the exhaust path to the turbine at maximum braking power includes as it were a fixed component, determined by the shut-off device, and a variable component, which depends on the degree of opening of the blow-off valve. Based on the maximum braking power, the free cross section of flow in the exhaust path to the turbine is therefore defined as follows:

$$A_T = A_D + dA_{V,max}$$

where $A_D$ is the cross section left free by the shut-off device used as a fixed restrictor at the transition between the flow duct 8 and the turbine rotor, while $dA_{V,max}$ denotes the variable component of the cross section exposed by the blow-off valve at maximum braking power. The ratio VF of $dA_{V,max}$ to $A_D$ is preferably greater than 0.2 and, in particular, is in the range between 0.2 and 0.1, and the ratio VF chosen should be higher, the higher the braking power is supposed to be at low engine speeds.

FIG. 4 illustrates this in a schematic diagram in which the braking power P is plotted against the engine speed N, the curve a describing the situation as regards an internal combustion engine/turbocharger system in which the cross section of flow in the exhaust path to the turbine is kept the same over the entire engine speed range, in practical terms, therefore, this being the case in which, referring to the illustrative embodiment shown in FIGS. 1 and 2, only the shut-off device would be used in braking mode and there would be no blow-off valve. Curve trace b intersects curve trace a at the design point $P_{max}$ for maximum braking power but lies above curve trace a and illustrates an engine design in which a higher braking power is desired even in the low engine-speed range and in which, therefore, based on an analogous engine configuration and the same quantities of exhaust gas, the cross section of flow in the exhaust path to the turbine must be smaller in the low engine-speed range. This design with a smaller cross section of flow in the low engine-speed range corresponds to an increase in the variable component of the cross section for the upper engine-speed range since otherwise the maximum braking power would be reached at a lower engine-speed level. The start of the opening of the blow-off valve is indicated at $P_ö$; without adding the variable outflow cross section $dA_v$, the steeper curve shown in dashes would be obtained, starting from $P_ö$.

Curve trace c represents another variant with an even higher braking power in the low engine-speed range and, assuming the same basic design of the engine, the variable component of the cross section of flow must be greater for the upper engine-speed range than in case b if the maximum braking power $P_{max}$ is to be achieved at the same engine speed. Here too, as with curve trace b, the cut-in point for the variable component, i.e. the cut-in point for the blow-off valve, is denoted by $P_ö$, the blow-off valve having to be opened to an ever greater extent from the cut-in point up to $P_{max}$.

The addition of the variable outflow cross section $dA_v$ thus preferably takes place at lower engine speeds as the variable component of the total opening cross section or the braking power in the low engine-speed range increases, in order to ensure a uniform increase in braking power against engine speed.

With regard to the internal combustion engine/turbocharger system, the maximum braking power is expediently achieved in an engine-speed range above the rated engine-speed range, i.e. the speed of the engine at maximum power. If the rated engine speed is 1800 rpm, the engine speed at maximum braking power can, for example, be in the region of 2300 revolutions per minute, this representing a preferred design. The upper engine-speed range, in which an additional, variable outflow cross section that increases with engine speed is exposed, expediently begins at approximately ⅔ to ¾ of the engine speed at maximum braking power, the size of the variable component of the cross section preferably increasing continuously as a function of the engine speed until the maximum braking power is reached, which forms the reference point for the above-explained configuration of the system for maximum braking power with minimum thermal loading.

What is claimed is:

1. An internal combustion engine/turbocharger system in which the internal combustion engine is provided with at least one variable-volume combustion chamber and has an engine displacement determined by the sum of the differences between the smallest and the largest volume of the combustion chambers of the internal combustion engine, and in which the turbocharger system assigned to the internal combustion engine has at least one turbine, which is arranged in the exhaust path of the internal combustion engine and has a flow duct which opens via a region in the form of an annular nozzle onto a turbine rotor, into the inlet cross section of which a shut-off device can be introduced for the braking mode, by means of which shut-off device, as a fixed restrictor, the cross section of flow at the transition to the turbine rotor can be defined, characterized in that the exhaust path to the turbine is additionally provided with a blow-off valve, the opening cross section of which can be controlled, and in that, based on braking operation at the maximum braking power of the internal combustion engine, there is the following relationship between a cross section of flow $A_T$ exposed in the exhaust path to the turbine by the shut-off device and the blow-off valve at maximum braking power, an inlet diameter $D_T$ of the turbine rotor and a displacement $V_H$ of the internal combustion engine:

$$TBF = A_T \times \frac{D_T}{V_H}$$

where TBF, which denotes the turbo-braking factor, is less than 0.005 (5%).

2. The internal combustion engine/turbocharger system according to claim 1, characterized in that the turbo-braking factor TBF is between 0.001 and 0.003 (1–3%).

3. Internal combustion engine/turbocharger system according to claim 2, characterized in that the turbo-braking factor TBF is 0.002 (2%).

4. The internal combustion engine/turbocharger system according to claim 1, characterized in that the following equation applies to the free cross section of flow $A_T$ in the exhaust path to the turbine at maximum braking power:

$$A_T = A_D + dA_{V,max}$$

where $A_D$ is the cross section of flow exposed at the transition to the turbine rotor by the shut-off device with the blow-off valve closed, and $dA_{V,max}$ is an additional outflow cross section exposed by the blow-off valve at maximum braking power.

5. Internal combustion engine/turbocharger system according to claim 4, characterized in that the following equation applies to the ratio VF of the cross section of flow $A_D$, exposed at the transition to the turbine rotor by the shut-off device with the blow-off valve closed, to the additional outflow cross section $dA_{V,max}$ exposed by the blow-off valve at maximum braking power:

$$VF = \frac{dA_{v,max}}{A_D} > 0.2.$$

6. The internal combustion engine/turbocharger system according to claim 5, characterized in that the additional outflow cross section $dA_{V,max}$ of the blow-off valve exposed at maximum braking power is the upper limiting value which the outflow cross section $dA_V$ can adopt within a range of outflow cross sections in the exhaust path to the turbine.

7. The internal combustion engine/turbocharger system according to claim 6, characterized in that the variable outflow cross section $dA_V$ can be varied as a function of the engine speed.

8. Internal combustion engine/turbocharger system according to claim 7, characterized in that the variable outflow cross section $dA_V$ becomes smaller as the engine speed decreases.

9. The internal combustion engine/turbocharger system according to claim 6, characterized in that the range of outflow cross sections is associated with an upper range of an engine-speed band that extends up to the engine speed corresponding to the maximum braking power.

10. The internal combustion engine/turbocharger system according to claim 9, characterized in that the maximum braking power occurs at an engine speed above the rated speed of the internal combustion engine.

11. The internal combustion engine/turbocharger system according to claim 9, characterized in that the upper engine-speed range in which an additional, variable outflow cross section $dA_V$ is exposed starts at about ⅔ to ¾ of the engine speed at maximum braking power.

12. The internal combustion engine/turbocharger system according to claims 6, characterized in that the maximum braking power occurs at an engine speed which is about ¼ to ⅓ times higher than the rated speed at the rated power of the internal combustion engine.

13. The internal combustion engine/turbocharger system according to claim 1, characterized in that the shut-off device is formed by a guide vane system with blading that is fixed for the braking mode.

14. The internal combustion engine/turbocharger system according to claim 1, characterized in that the shut-off device is formed by a sleeve which at least essentially covers the cross section of the annular nozzle in braking mode.

15. The internal combustion engine/turbocharger system according to claim 14, characterized in that the shut-off device is designed as a sleeve provided with holes or cutouts.

* * * * *